Nov. 1, 1927.
H. L. TANNER
1,647,419
LIQUID CONTROLLED GYROCOMPASS
Original Filed Nov. 19, 1918   2 Sheets-Sheet 1
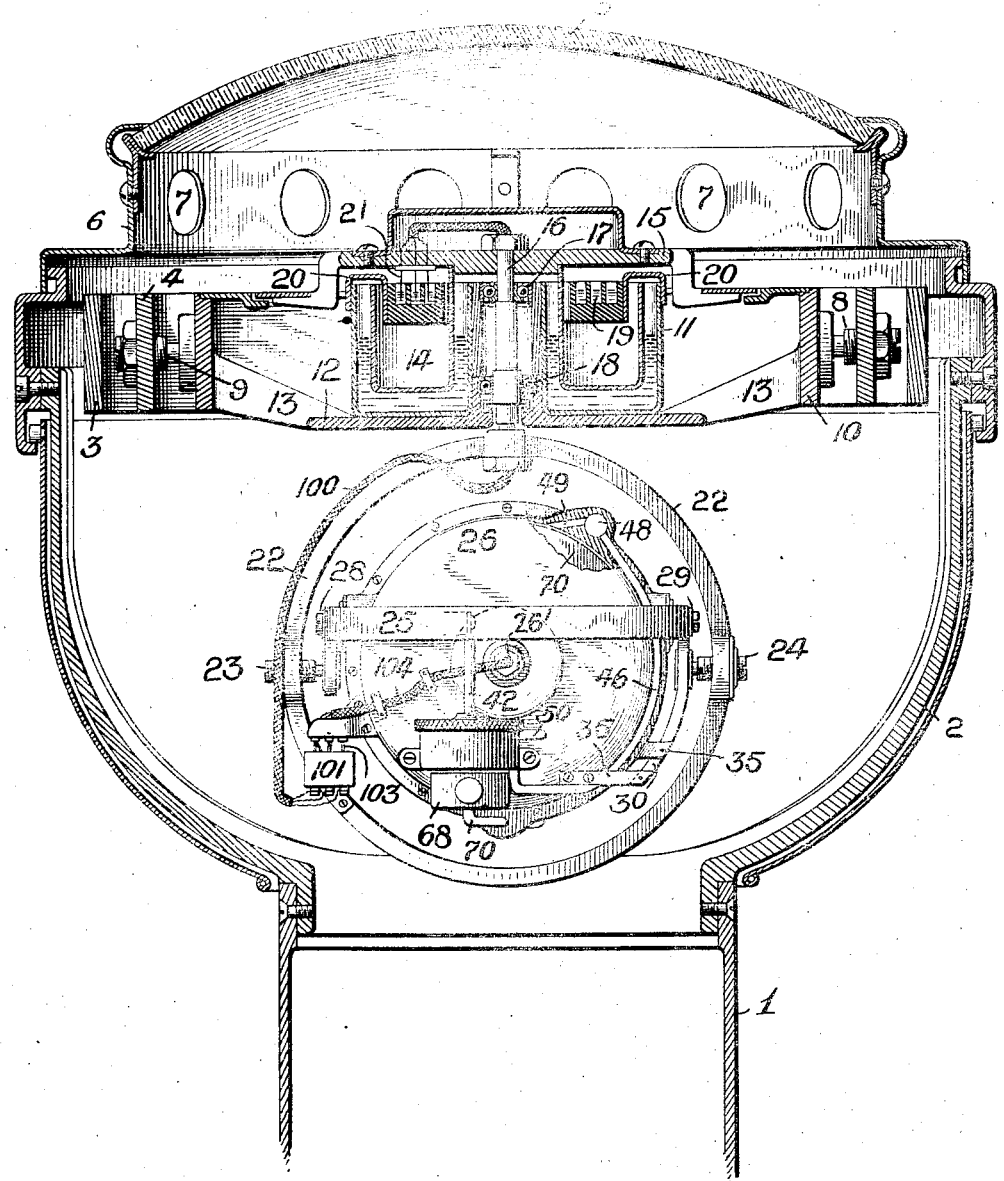
Inventor
HARRY L. TANNER.
By his Attorney
Herbert H. Thompson

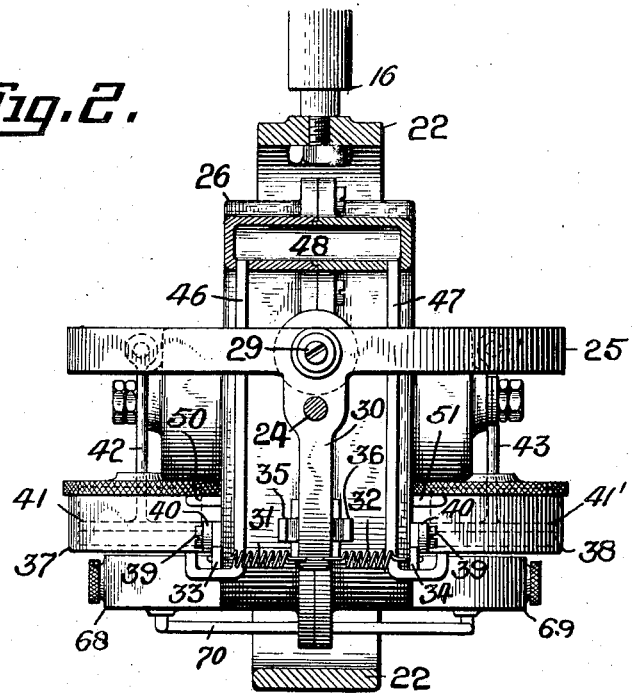

Patented Nov. 1, 1927.

1,647,419

UNITED STATES PATENT OFFICE.

HARRY L. TANNER, OF BROOKLYN, NEW YORK, ASSIGNOR TO THE SPERRY GYROSCOPE COMPANY, OF BROOKLYN, NEW YORK, A CORPORATION OF NEW YORK.

LIQUID-CONTROLLED GYROCOMPASS.

Original application filed November 19, 1918, Serial No. 263,118, and in Great Britain November 19, 1919. Divided and this application filed November 25, 1921. Serial No. 517,490.

This invention relates to gyroscopic compasses, especially to that type of compass in which the gyroscope itself is substantially balanced about the horizontal axis and meridian seeking properties imparted thereto by the application of a force upon the gyroscope, upon inclination of the same.

This general type of compass is at present constructed in three general designs, first, one in which a heavy weight is pivotally mounted independently of the gyro-casing and connected to the same by an eccentric coupling, second, a compass in which a heavy liquid such as mercury is employed to impart meridian seeking properties to the gyroscope, the mercury being contained in containers on opposite sides thereof and acting freely under the influence of gravity without the employment of any independent source of power or other control device. In the third form of compass, a source of power is made use of to shift the relative positions of the center of support and the center of gravity of the gyroscope, said source of power being in general controlled by an auxiliary pendulum. It is to this last class of compasses that this invention relates. This application contains matter divided from my co-pending application 263,118 for gyroscopic compasses, filed November 19, 1918.

The principal difficulty with this type of compass is that while the compass proper is non-pendulous, the governor used to bring into action the external means for imparting meridian seeking properties thereto, is necessarily under gravitational influence, being usually a damped pendulum and hence is subject to the disturbing influences of rolling and pitching. It is one object of this invention to overcome this difficulty by employing a base line or governor which is substantially free from rolling and pitching disturbances.

Another object of the invention is to provide a simpler method of making the gyroscope pendulous when it becomes inclined than by the methods now employed.

Further objects of the invention will appear as the description proceeds.

Referring to the drawings in which what I now consider to be the preferred form of my invention is shown, Fig. 1 is a north elevation of my gyroscopic compass, housing and vertical support being shown in section.

Fig. 2 is a vertical section thereof, taken at right angles to Fig. 1, but not cutting through the gyro case.

Fig. 3 is a detail of the electrical connection between the vertical ring and casing.

Fig. 4 is a detail of the upper part of the vertical ring and casing, portions being shown in cross section.

The gyroscope as shown in Fig. 1 is mounted upon the base 1 to which is secured a bowl 2 supporting the gimbal rings 3 and 4 of the compass. The bowl is shown as covered by a convex glass top 5, secured to the metal ring 6, in which ventilating holes 7 are provided. The inner ring 4 supports on horizontal pivots 8 and 9 a frame 10. Said frame supports the gyroscope proper for rotation about the vertical axis by any suitable means. For this purpose, I have shown an annular bowl 11 supported on a plate 12 held by bracket arms 13. Said bowl is designed to contain mercury or other suitable liquid with which to support the annular hollow float member 14. Said float is secured at its center to the plate 15 which supports the vertical stem 16 of the compass. Said stem may be journalled in radially disposed anti-friction bearings 17 and 18 supported from plate 12. Current may be introduced into the gyroscope for driving the rotor by means of a plurality of annular mercury cups 19 secured to the basin 11 by an annular bracket 20 which preferably also serves to cover the surface of the mercury. A plurality of brushes or contact points 21 secured to the plate 15 dip in the annular mercury cups and thus serve to introduce current into the gyroscope, the current being carried preferably from the brushes down the central stem 16 thence through cable 100 to junction box 101. Said box is provided with a plurality of mercury troughs into which contacts 103 secured to casing 26 dip. From the contacts, a cable 104 leads into the casing through the shaft 26'.

Vertical stem 16 is shown as supporting vertical ring 22, in which the gyroscope proper is mounted on horizontal pivots 23, 24. Instead of supporting the gyroscope directly on said pivots however, I prefer to interpose an intermediate member 25 between the gyro casing 26 and ring 22. Said member 25 is pivoted on pivots 23, 24, on a horizontal axis and in turn carries the gyro casing on horizontal pivots 28, 29. The last named pivotal axis is preferably parallel to and in the same vertical plane with the first named pivotal axis, being shown directly above the same, (see Fig. 2). The gyroscope and its contained parts is preferably substantially balanced about the pivotal axis 23, 24, so that as long as the axis 28, 29 is directly above the axis 23, 24, the gyroscope is perfectly balanced and therefore, unaffected by acceleration pressures due to rolling and pitching of the ship and the like. Member 25 is however yieldingly connected with the gyrocasing. For this purpose, I have shown an arm 30 leading downwardly from the member 25 and connected on either side adjacent its lower end to the gyro casing, by means of tension springs 31, 32 connecting said member to lugs 33 and 34 on the gyro case. I have also shown stops 35, 36 cooperating with said extension 30, to prevent overturning of the parts when the gyroscope is not running.

On each side of the gyro case 26 is a small cylinder 37, 38, secured to the case by means such as screws 39, passing through wings 40 on the cylinders. In said cylinders are pistons 41, 41' connected by piston rods 42, 43 to the member 25. Connecting with the cylinders below the respective pistons are a pair of pipes 46 and 47 leading to the opposite ends of a reservoir, 48 formed in the casing 26 beyond the periphery of the rotor 70 and centrally situated. A return connection 50, 51 is provided from each cylinder to the interior of the casing. Within the casing 26 and adjacent the periphery of the rotor, I provide a passageway 49 leading to said receptacle. The action of this portion of my invention is as follows: The interior of the rotor case 26 is partially filled with oil. As the rotor 70 revolves, the oil will be thrown out around the rotor to the periphery thereof and from there carried over to the surrounding casing. A film of oil will hence circulate around the interior of the casing while the passageway 49 will serve to lead off a portion of said circulating oil into the reservoir. As long as the casing is horizontal, the oil from the reservoir will flow with equal velocity through the vertical pipes 46, 47, the effective height of the oil columns being the same, and down into the cylinders 37, 38, exerting equal pressure therefore upwardly on said pistons and holding the pivots 28, 29, directly above the pivots 23, 24. Springs 31, 32, assist in this action. A certain amount of oil will leak past the pistons and work back into the casing through the pipes 50, 51. The receptacle 48 with its connected oil columns and cylinders, hence, constitutes a very sensitive liquid level device, having a long period.

In case however, the gyroscope should become inclined, say in a clockwise direction, (Fig. 2), or in case of a prolonged acceleration pressure thereon, it will be seen that the effective height of the column of oil on pipe 47 will be increased and the oil will gradually flow slightly faster down said pipe 47, thereby exerting a greater pressure upon the piston 41', than upon the piston 41. This will slowly tilt the member 25 in a counter-clockwise direction and hence displace pivots 28, 29, to the left of the pivots 23, 24, against the action of the centralizing spring 32, until the extra pressure thereon is balanced by the increasing tension of centralizing spring 32.

This relative displacement of the center of gravity and the center of support of the gyroscope, will it will be seen displace the center of gravity to the high side of the gyroscope and therefore tend to cause the gyroscope to act as a pendulum and return to its normal position under the influence of gravity. The gyroscope of this invention will hence normally rotate in the same direction as the earth.

A reverse inclination, will of course, result in a reversal of the action described above. Short period acceleration pressures such as those due to rolling and pitching of the ship, have little if any effect on the slow moving pistons 41, 41', since such pressures reverse before the slow acting pistons can respond to temporary changes in height.

For damping this type of gyroscope, I have shown secured to the opposite sides of the casing, a pair of smaller receptacles, 68, 69, connected by a tube 70. Any slow moving liquid, such as oil, may be used in said receptacles, the oil acting to damp the oscillation thereof by acting in the opposite direction to the action of gravity on the gyroscope and also out of phase therewith. For the latter purpose, the tube 70 connecting the receptacle is made with a small bore so as to give the oil a long period.

From the foregoing it will be seen that while I retain all of the advantages of the non-pendulous gyroscopic compass in which an auxiliary source of power is made use of to impart meridian seeking properties thereto, I have avoided the use of auxiliary apparatus for obtaining a base line, which apparatus is usually subject to acceleration pressures, due to rolling and pitching of the ship, and make use of a liquid level device, i. e., receptacle 48 and liquid columns 46, 47, which on account of the long period thereof, is not appreciably affected by rolling and pitching errors.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined and the invention extends to such use.

Having described my invention what I claim and desire to secure by Letters Patent is:—

1. In gyroscopic apparatus, the combination with a support, a member supported thereon for oscillation about an axis, a rotor and rotor bearing frame supported for oscillation on said member about an axis parallel to the first named axis, a centralizing coupling between said frame and member, and means brought into action upon inclination of the gyroscope for causing said member to rotate about said first axis in the opposite angular direction to the existing inclination.

2. In gyroscopic apparatus, the combination with a support, a member supported thereon for oscillation about an axis, a rotor and rotor bearing frame supported for oscillation on said member about an axis parallel to the first named axis, resilient centralizing means connecting said member and frame, and power means connecting said member and frame adapted to tilt said ring with respect to the casing against the action of said centralizing means.

3. In a gyroscopic compass, the combination with a frame mounted for rotation about a vertical axis, a member pivotally mounted in said frame about a horizontal axis, a gyro-casing pivotally mounted in said member about an axis parallel to and normally in the same vertical plane as said horizontal axis and means brought into action by inclination of said casing for displacing said last named axis to one side of said vertical plane.

4. In a gyroscopic compass, the combination with a frame mounted for rotation about a vertical axis, a member pivotally mounted in said frame about a horizontal axis, a gyro-casing pivotally mounted in said member about an axis parallel to and normally in the same vertical plane as said other horizontal axis, yielding centralizing means connecting said casing and said member, and means brought into action by inclination of the gyroscope in either direction for displacing said last named axis in the opposite direction to said inclination.

5. In a gyroscopic compass, a gyro-casing and rotor, means for mounting the same, for oscillation about a horizontal axis in a substantially balanced condition, including a vertical frame and an intermediate member pivoted on said frame and in which the said casing is pivoted, the two pivotal axes being normally in line, vertically, yielding means connecting said member and gyro-casing, and means for tilting said member against said yielding means.

6. In a gyro-compass, the combination with the gyro-casing and rotor, of a liquid level device supported on said casing, means for supporting said casing for orientation and for oscillation about a horizontal axis, and means brought into action by the flow of the liquid in said device due to the tilting of the casing for shifting the relative positions of the center of gravity of the gyro-casing and its supported parts and the horizontal axis of support in the opposite direction to the flow of the liquid.

7. In a gyroscopic compass, the combination with a frame mounted for rotation about a vertical axis, a member pivotally mounted in said frame about a horizontal axis, a gyro-casing pivotally mounted in said member about an axis parallel to and normally in the same vertical plane as said other horizontal axis and means brought into action by inclination of the gyroscope for displacing said last named axis to one side of said vertical plane.

8. In a gyroscopic compass, the combination with a frame mounted for rotation about a vertical axis, a member pivotally mounted in said frame about a horizontal axis, a gyro-casing pivotally mounted in said member about an axis parallel to and normally in the same vertical plane as said horizontal axis, an oil receiver on said gyro-casing having an opening into said casing adjacent the periphery thereof, an oil operated piston and cylinder connecting said member and frame for displacing said last-named axis to one side of said vertical plane, and a connection between said receiver and cylinder.

9. In a gyroscopic compass, the combination with a frame mounted for rotation about a vertical axis, a member pivotally mounted in said frame about a horizontal axis, a gyro-casing pivotally mounted in said member about an axis parallel to and normally in the same vertical plane as said horizontal axis, an oil receiver on said gyro-casing having an opening into said casing adjacent the periphery of the gyro-rotor, a pair of balanced oil operated pistons and cylinders connecting said member and frame for displacing said last named axis to one side of said vertical plane and connections between said receiver and cylinders.

10. In a gyroscopic compass, the combination with a frame mounted for rotation about a vertical axis, a member pivotally mounted in said frame about a horizontal axis, a gyro-casing pivotally mounted in said member about an axis parallel to and normally in the same vertical plane as said horizontal axis, a level device on said gyroscope, a pair of balanced pistons and cylinders acting between said gyroscope and said member for displacing said last named axis to one side of said vertical plane, and means for operating said pistons from said level device upon inclination thereof.

In testimony whereof I have affixed my signature.

HARRY L. TANNER.